United States Patent [19]

Morrison et al.

[11] Patent Number: 5,523,139
[45] Date of Patent: Jun. 4, 1996

[54] METHOD AND APPARATUS FOR FORMING SPLICES IN FLEXIBLE, FUSIBLE MATERIAL AND MATERIAL SPLICED ACCORDINGLY

[75] Inventors: Kyle E. Morrison; Kenneth R. Wilmoth; Richard D. Neal, all of Kingsport; Jimmie L. Cox, Jonesborough, all of Tenn.

[73] Assignee: Eastman Chemical Company, Kingsport, Tenn.

[21] Appl. No.: 124,905

[22] Filed: Sep. 21, 1993

Related U.S. Application Data

[62] Division of Ser. No. 892,443, Jun. 2, 1992, Pat. No. 5,356,498, which is a division of Ser. No. 562,876, Aug. 6, 1990, abandoned.

[51] Int. Cl.⁶ .................................................. B32B 3/00
[52] U.S. Cl. ............................ 428/57; 57/22; 57/202; 57/350; 428/58; 428/61
[58] Field of Search ..................... 428/57, 58, 61; 57/202, 350, 22; 156/73.4, 304.6, 304.1, 158, 157, 159

[56] References Cited

U.S. PATENT DOCUMENTS

| T913,005 | 8/1973 | Duram | 156/158 |
|---|---|---|---|
| 3,184,354 | 5/1965 | Strother | 156/73 |
| 3,821,048 | 6/1974 | Acker | 156/73 |

*Primary Examiner*—Nasser Ahmad
*Attorney, Agent, or Firm*—John F. Stevens; Charles R. Martin

[57] ABSTRACT

Disclosed is a method and apparatus for forming diagonal splices in flexible, fusible material and the material spliced accordingly. The splice is formed by overlapping the material, tensioning the material at the area to be spliced, and heating a strip of the material under tension to its fusion temperature, thereby fusing and separating the material at the strip. The splice is nearly undetectable to the untrained eye.

2 Claims, 4 Drawing Sheets

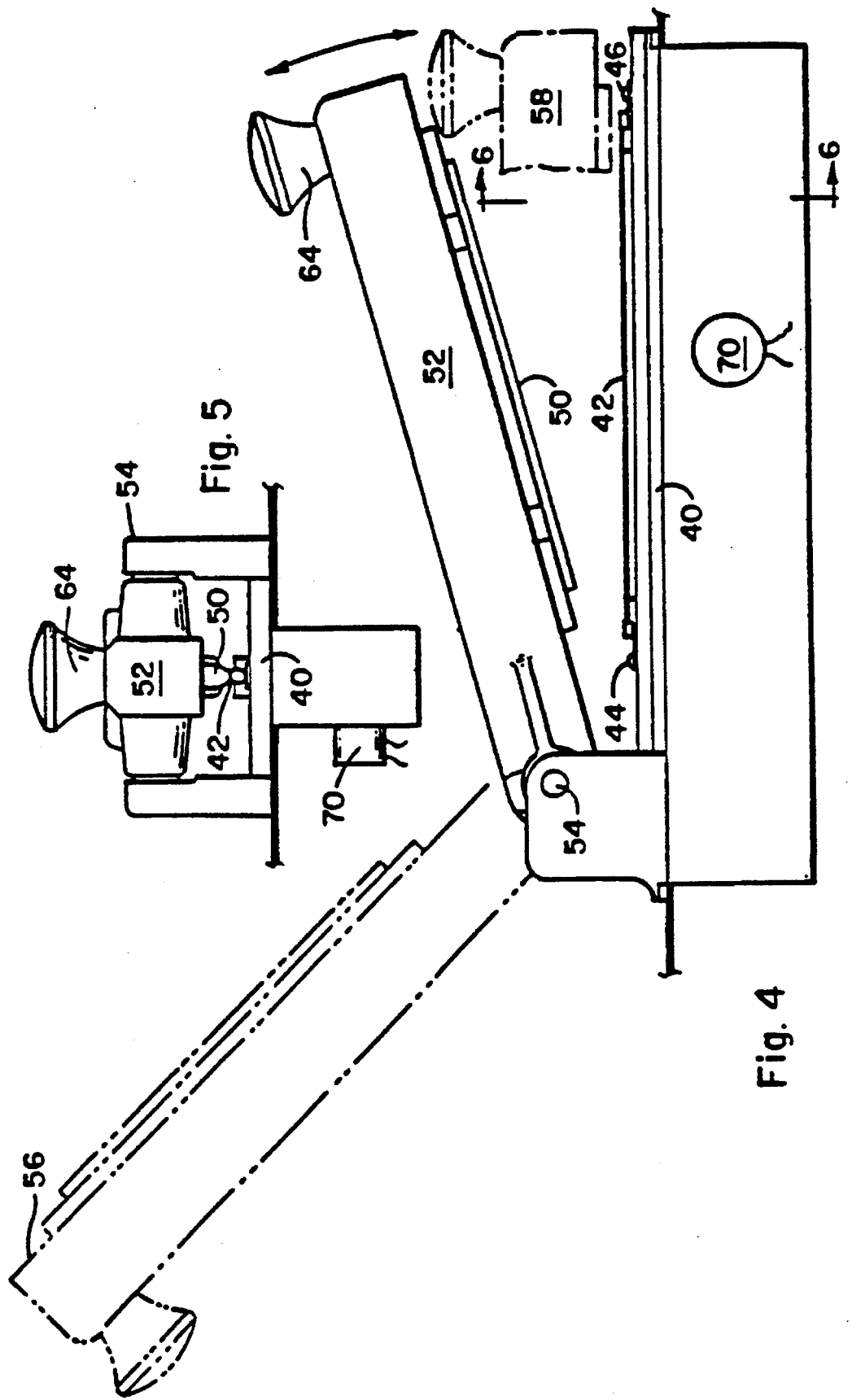

METHOD AND APPARATUS FOR FORMING SPLICES IN FLEXIBLE, FUSIBLE MATERIAL AND MATERIAL SPLICED ACCORDINGLY

This is a divisional application of application Ser. No. 07/892,443 filed on Jun. 2, 1992, now U.S. Pat. No. 5,356,498 which is a divisional of 07/562,876 filed Aug. 6, 1990 now abandoned.

TECHNICAL FIELD

This invention relates to a method and apparatus for forming splices in flexible, fusible material and material spliced accordingly. The invention is especially applicable to thermoplastic material such as elongated films, sheets, ribbons, and fibrous tow.

BACKGROUND OF THE INVENTION

Elongated materials (sometime referred to as continuous) in the form of films, sheets, ribbons, tows, etc. obviously have many known uses. For example, film or sheet material is useful in the packaging art. As another example, tow (a bundle or band of many fibers of small diameter) is useful in the production of filters. Tow may be formed into semi-rigid rods of various densities and stiffness and used as filter material. In working with such elongated material, there are occasions when a splice needs to be made, because the associated machinery is designed to be operated on a continuous basis. If there should be a break in the feed of elongated material, time-consuming operations such as rethreading and returning to normal operating rate are required. Interruptions in the continuity of the material may result from breaks in the material, equipment malfunction, or possibly change-over from one container to another. Therefore, for reasons of production efficiency, it can be important to attach a leading end of one length of elongated material to the trailing end of another length to insure continuity of operation.

Splices made by prior-art devices generally produce highly visible, charred defects across elongated material such as tow. For example, in U.S. Defensive Publication T913,005 "Method of Tow Splicing", a method is described which is useful for splicing tows and the like. The sections of tow to be joined are placed one above the other in an essentially parallel "side-by-side" relationship. One such section is located in contact with a suitably mounted wire and a clamping means is caused to contact the other tow section. While thus clamped an electrical current is passed through the wire, causing it to heat up and melt the two tow sections, producing a highly-visible, charred splice which is oriented across the tow in a substantially perpendicular relationship to the long axis of the spliced tow. Such splices are useful for various purposes, such as joining tow from the bottom of one bale to tow from the top of a new bale to facilitate the continuation of operation of the plugmaker machinery, etc. However, the splices created by this prior-art method are totally unsuitable for use in some cases such as filters because they create highly-visible defects which do not bloom acceptably in subsequent passage through banding jets during conversion of the tow into filters. Thus, tow containing such prior-art splices is generally allowed to pass through the various stages of the processing machinery, such as a plugmaker, etc., and then the machinery is stopped and the product containing the splices is removed. After removal of the defective product or intermediate product, the processing machinery can be restarted. Such stop-and-start procedure causes loss of efficiency and can have an adverse effect on product quality.

BRIEF DESCRIPTION OF THE DRAWINGS

FIG. 4 is an enlarged side view of the splicing clamp;

FIG. 5 is an end view of the splicing clamp;

DESCRIPTION OF THE INVENTION

Figure 1:
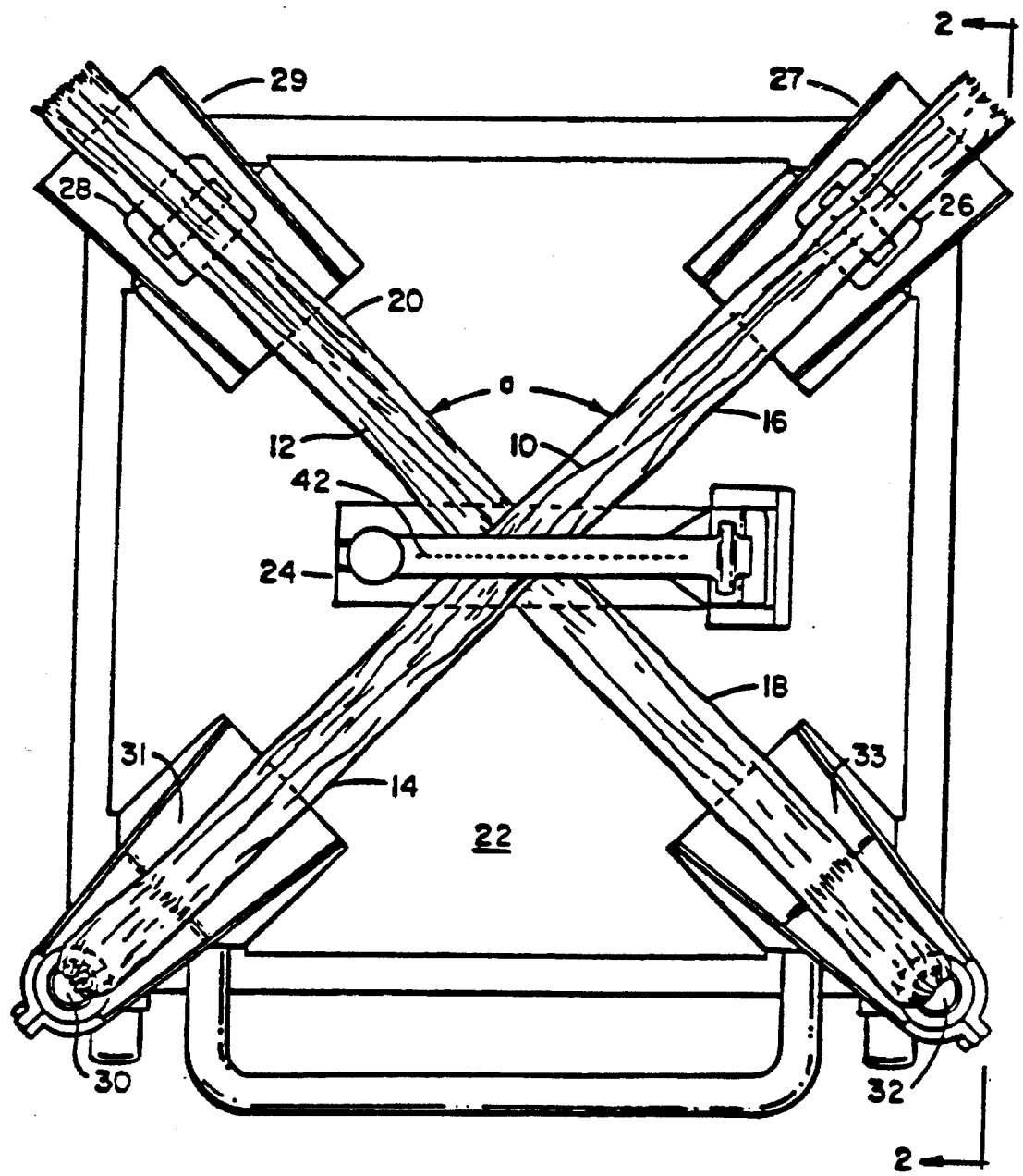
FIG. 1 is a plan view of the splicing apparatus according to this invention showing two pieces of material ready to be spliced.

According to the present invention, there is provided elongated, flexible, preferably resilient, fusible, relatively-flat, band-like material having a diagonal splice with respect to its length which is more difficult for the untrained eye to detect than splices according to prior art as described herein.

According to another aspect of the invention, there is provided elongated, flexible, fusible, relatively-flat, band-like material made of crimped fibers of cellulose acetate having a diagonal splice with respect to its length wherein the total color difference between the material in said splice and the adjacent material is nearly undetectable to the untrained eye.

According to another aspect of the invention, there is provided elongated, flexible, fusible, relatively-flat, band-like material made of crimped fibers of cellulose acetate having diagonal splices with respect to the length wherein the average total color difference expressed in DE* CIELAB values is less than 3 between the material in the splices and the adjacent material as described herein.

According to another aspect of the invention, there is provided elongated, flexible, fusible, relatively-flat, band-like material made of crimped, cellulose-acetate fibers having diagonal splices with respect to its length wherein the average total color difference between the diagonal splices and the adjacent material is substantially less than the average total color difference between splices of prior art and the adjacent material as described herein.

According to still another aspect of the invention, there is provided elongated, flexible, fusible, relatively-flat, band-like material made of crimped, cellulose-acetate fibers having diagonal splices with respect to its length which a) are significantly more blue in average CIELAB values than the splices of prior art and b) are more difficult for the untrained eye to detect than splices of prior art as described herein.

According to still another aspect of the invention, there is provided elongated, flexible, fusible, relatively-flat, band-like material made of crimped fibers of cellulose acetate having diagonal splices with respect to its length which is nearly undetectable to the untrained eye and which is significantly lighter in average CIELAB DL* values compared to splices of prior art as described herein.

According to still another aspect of the invention, there is provided a method of splicing fusible, preferably resilient material comprising the steps of superimposing two sections of the material in a nonparallel, crossed relationship, tensioning the sections in a controlled manner at or above a selected tension and heating to its fusion temperature a compressed strip of the superimposed sections along a line which substantially bisects the superimposed sections to create a subsequent diagonal splice of between about 20 and 70 degrees with respect to the lengthwise dimension of the material wherein the tensioning causes the newly-spliced material to withdraw from the line as described herein.

According to still another aspect of the invention, there is provided a method of splicing fusible material comprising the steps of superimposing two sections of the material in a substantially parallel relationship, tensioning the sections in a controlled manner above a selected tension, and heating to its fusion temperature a compressed strip of the superimposed sections along a line wherein such strip is not perpendicular to the lengthwise dimension of the material and a subsequent substantially diagonal splice of between about 20 and 70 degrees with respect to said lengthwise dimension is created wherein the tensioning causes the newly-spliced material to withdraw from said line as described herein.

According to still another embodiment of the invention there is provided apparatus for splicing flexible, fusible, relatively flat material comprising a) a splicing clamp having a heating element and a cooperating pressure member which are adapted to be clamped on superimposed portions of the material, b) supporting means for holding material to be spliced in crossed, superimposed position across the clamp, c) means for tensioning the material across the clamp, d) means for heating the heating element, whereby upon closing the splicing clamp and heating the heating element the material fuses together and separates from the element under tension to form two separate spliced lengths of material.

The elongated material referred to herein may be in the form of a film or sheet, fiber bundle, ribbons, tow, etc. The present invention is found to be particularly useful in splicing tow of thermoplastic polymeric material such as, for example, cellulose esters, polyesters and polyolefins. Of particular interest is tow of cellulose acetate, which is commonly composed of numerous continuous filaments of about 1.6 to 8 denier (1.8 to 8.9 decitex) per filament. Such tow is usually crimped and commonly ranges from about 24,000 to about 100,000 (about 2.67 to about 11.1 kilotex) total denier in a generally flat band. The tow can be crimped crosswise of its lengthwise dimension in a manner well known in the art, such that it is resilient in the lengthwise direction.

When the trailing end of one tow is to be spliced to the leading end of another tow, the present invention is utilized by grasping the two ends of the tows, superimposing them in a crossed fashion upon a support, applying tension, compressing and heating the tows along a line where they are superimposed until they are fused, and using the tension applied to the tows to separate them when fused in such a manner that a splice is formed.

Referring to the drawings, FIG. 1 illustrates two lengths of flexible, fusible tow 10 and 12 which are to be spliced on a line within the area where they are superimposed, or crossed. Tow 10 comprises an end portion 14 and a main portion 16. Likewise, tow 12 comprises an end portion 18 and a main portion 20. The end portions normally are broken or otherwise terminated ends which are to be discarded after the completion of a splice. The main portions are to be spliced so as to make a continuous, or at least an extended length of tow. As used herein, the lengthwise dimension is, of course, the longitudinal or elongated dimension, while the crosswise dimension is generally perpendicular thereto. Tows 10 and 12 can be at least partially supported on table 22, across splicing clamp 24. Tows 10 and 12 are held stationary by suitable clamps 26 and 28 respectively, which may suitably be vacuum clamps as subsequently described or other suitable clamping means, including a combination of vacuum clamp plus a mechanical-pressure device. Tow ends 14 and 18 are placed in tensioning means 30 and 32 which may suitably be fluid jets which exert a drawing or tensioning force on the tows in directions away from the clamps 26 and 28.

Various suitable fluid jets are well known in the art and are commercially available. The fluid jets may conveniently be Venturi or other type jets, e.g., Beck Ringjet Airmover, available from D. N. Beck & Company, Ltd., London. Novel means for clamping and tensioning the tow are provided. In both cases, flows of air through suitable fluid jets are used. Both the vacuum clamps and fluid jets can be actuated manually at will. Vacuum may be communicated to vacuum clamps 26 and 28 by suitable means, e.g., a suitable vacuum creating means and conduit system. The vacuum clamp consists of at least one suitably-mounted porous screen upon which the tow or other material is supported while being held in place by the pull of the vacuum. Preferably, a rib extends across and above the screen at right angles to the longitudinal dimension of the tow such that the tow is pulled onto the screen in at least two places, thereby wrapping partially around the rib thereby enhancing the holding power of the vacuum.

Preferably, vacuum clamps 26 and 28, jets 30 and 32 and splicing clamp 24 are arranged on support 22 in such manner that the splice to be formed in the tow (shown in phantom lines in FIG. 3) is at an angle of greater than 20° and less than 70° with respect to edge or longitudinal dimension of the tow. This, then, means that the angle "a" between the crossed tows 10 and 12 should be between about 40° and 140°.

Figure 6:
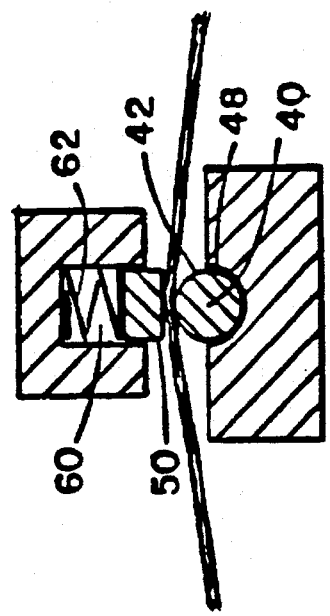
FIG. 6 is a section view taken along line 6—6 of FIG. 4.

A preferred type of splicing clamp is best illustrated in FIGS. 4, 5, and 6. This illustrated splicing clamp 24 includes a lower member 40 which is provided with heating element 42 attached thereto at 44 and 46. Heating element 42 is conveniently electrically heated by means (not shown) using resistance heating techniques well known in the art.. Heating element 42 is preferably partly contained in groove 48 of lower member 40 to prevent any possibility of misalignment with pressure member 50 when the splicing clamp is closed. Splicing clamp 24 also comprises an upper member 52 which is pivoted at 54 to lower member 40. An open position is illustrated at 56 and a closed position is illustrated at 58. Upper mender 52 carries pressure member 50 which is adapted to cooperate with heating element 42 to form a clamp. Pressure member 50 is preferably contained in a slot 60 in upper member 52 and is biased by one or more springs 62 (or by other means such as compressible, resilient material) so that substantially uniform contact and pressure are achieved when the splicing clamp is closed. The construction of the splicing clamp 24 should be sufficiently precise that heating element 42 and pressure member 50 correctly align themselves when the clamp is closed to position 58. Handle 64 is provided for manually opening and closing the splicing clamp in the preferred embodiment.

It is preferred that the heating element and pressure member be constructed of materials such that the material being spliced does not stick to them. Suitable material for the pressure member 50 includes suitable fiberglass sheets or tapes impregnated with Teflon polymer, sheets or blocks made from Teflon polymer, sheets, tapes or blocks made of Torlon poly(amide-imide) materials, suitably-coated ceramics or metals, etc. Suitable material for the heating element 42 includes nickel-chromium alloy or other suitable materials. Also, in some cases separation of the material at the line of fusion may be enhanced by the use of a small, conventional electric vibrator 70 attached to any part or parts of the splicing clamp and/or other components.

In operation, one would typically place the material to be spliced on the support 22 in the manner shown in FIG. 1. However, prior to such placement, both the tensioning means 30 and 32 and the clamping means 26 and 28 would be activated. In the preferred embodiment, a suitable air jet is used for each of the tensioning means and a vacuum clamp is used for each of the clamping means. Tow ends 10 and 12 are placed in turn in the opening of each tensioning means 30 and 32. The first end so placed, either tow end 10 or 12, is then located over and in contact with the heating element 42 and is then placed in contact with the appropriate clamping means 26 or 28. The second tow end 10 or 12 is then placed in the opening of the other tensioning means 30 or 32 and then guided by hand over the first tow end 10 or 12 so that the edges of the tow bands line up substantially with each other and also line up over the heating element 42. Such alignment is not difficult to accomplish but is important in order for the subsequent splice to extend at a diagonal substantially from one side of the newly-joined material, such as a tow band, to the other. The second tow end is then placed in contact with the second clamping means 26 or 28. With the completion of these placements, both tow ends 10 and 12 will be clamped in the desired locations and the tension will be obtained automatically. A brief final visual check will assure that the alignment over the heating element 42 has been maintained. If either tow end has changed position over said heating element, it is a simple matter to correct the alignment. Next, the splicing clamp is closed to position 58, either manually or by a suitable closing mechanism, to bring pressure to bear on the criss-crossed tow ends 10 and 12 between the heating element 42 and the pressure member 50.

Figure 3:
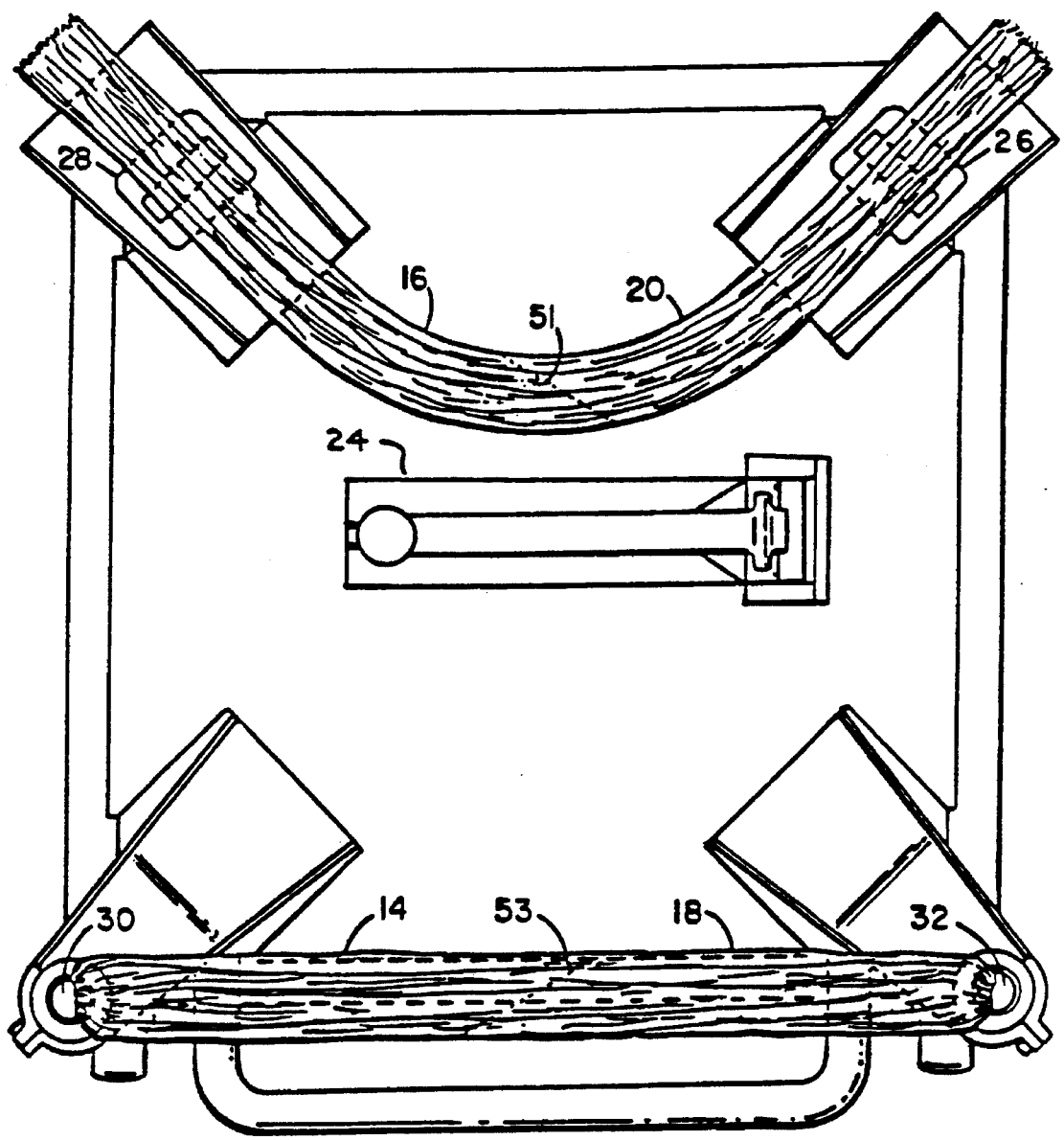
FIG. 3 is a plan view similar to FIG. 1, showing material after being spliced.

When the heating element reaches position 58, a suitable device, such as a microswitch, is operated in order to activate the heating element 42 and the material which has been compressed over the heating element 42 is heated. Upon reaching its fusion temperature, fusion of the material occurs substantially between the heating element 42 and the pressure member 50. The term "fusion temperature" refers to that temperature (or temperatures) at which the material, such as tow ends 10 and 12, softens and flows together to unite to form a splice 51 and, under the influence of the previously established tension, to retract spontaneously from contact with the heating element 42 and the pressure member 50 as shown in FIG. 3. It is thought that the spring-like quality of crimped tow is especially valuable in obtaining effective spontaneous retraction; however, suitable non-crimped materials can be successfully processed by our novel method to make low-visibility splices as described in Examples 4 and 8.

After fusion and spontaneous retraction have taken place, two fused ends 14 and 18 with splice 53 are drawn by the fluid jets 30 and 32 to the position shown in FIG. 3. The material involved is normally a short length and is considered waste because the portions that are below said fluid jets are not connected to anything and are usually in the form of short "tails" projecting a few inches from the output side (tail pipe) of the jets. The two main portions 16 and 20 of the resilient material, such as crimped fibrous tow, non-crimped ribbon or tape, etc., have been spliced as shown by splice 51 and have spontaneously retracted to the position shown in FIG. 3. At this point, the operator can manually remove the newly-spliced material (main portions 16 and 20 plus splice 51) and can place it in a suitable location, such as in a container or in a bin that is associated with a baling operation or in position to be wound onto a spool, bobbin, etc.

It should be emphasized that the fusion temperature referred to above is not necessarily the melting temperature of the material. Since the material on both sides of splicing clamp 24 is under tension, fusing and separation may occur prior to the material reaching a completely molten state. We believe that it is likely that greater tension being used for any given situation means quicker separation possibly at a lower temperature. However, with our novel splicer, the operator does not have control of the separation or retraction of the newly-formed splice from the grip of the heating element 42 and the pressure member 50. This separation or retraction occurs spontaneously whenever the fusion conditions are reached.

Further explanation of "spontaneous retraction" is warranted because it was an unexpected factor in our invention. A feature that we initially believed to be important in making low-visibility splices was that the process of creating a splice should be under the control of the person operating the splicing apparatus. Such control is certainly a characteristic of the prior art we have described wherein the operator maintains the material in the clamping means until, based on previous experience, it is certain that a splice has been completed. In the prior art procedure which we have cited, there is no spontaneous retraction as occurs in making our novel splices. The prior art splices remain under the control of the operator until after they have been completed, resulting in high-visibility and usually charred splices. During early attempts to reduce the visibility of the prior-art splices, crimped tow was maintained under various levels of tension using a criss-cross alignment at splicing angles of 45° and then later at other angles. During some of these investigations, various degrees of spontaneous retraction occurred at times and some low-visibility splices were obtained but not on a consistent basis. This surprising result indicated that the act of splicing should not remain under the complete control of the operator. In fact, just the opposite is true. Operators cannot consistently judge the instant at which a splice has been satisfactorily completed with the material in the splice remaining substantially free from discoloration, burning, charring, etc.

It should be seen from the above description of our invention that problems of overheating the material are eliminated. Thus, degradation which causes discoloration, charring and/or unacceptable thickening at the splice is prevented by the material being under favorable conditions which cause the splice to move away from the heat source. Without this self-separation, (spontaneous retraction) of the material, one would have a tendency to apply the heat for too long a time interval in order to insure an adequate splice.

If the tension is insufficient, the tow is subjected to heat for too long a time interval resulting in one or more of the following: oxidation, discoloration, charting, darkening, unacceptable amount of thickening, sticking to the heating element 42, and/or coating of said heating element. When the tension is too great, crimped tow is difficult to handle in placing it in the correct criss-cross position for splicing. At high tensions, as will be later explained in more detail, the crimped tow tends to become stringy due to separation of the individual fibers from each other in places across the tow and also there is a strong tendency to produce splices which do not capture substantially all of the fibers, thus allowing sections of fiber to be heat-severed but not connected to other fibers at the splice. The tow also is "worked" excessively by excessive tension, causing too much increase in width of the tow band. Overall, as will be described by example, the maximum acceptable tension range for fibrous tow of about 35,000 total denier was found to be about 25 to 100 grams with about 40 to 75 grams being the most effective overall and the most convenient in terms of handling the tow. The general relationship between total tow denier and tension range can be expressed in grams per denier and used to estimate the desirable tension ranges for crimped tows at higher and lower total tow deniers.

In a typical splicing operation, the following conditions may exist:

| Material to be spliced: | Crimped cellulose acetate tow, resilient in its lengthwise dimension at least in part due to its crosswise crimp |
| --- | --- |
| Width of tow band: | About 1.3 to 2.5 inches |
| Denier per fiber: | 3.0 (3.3 decitex per fiber) |
| Total tow denier: | 35,000 (3.9 kilotex) |
| Softening temperature of cellulose acetate: | about 375°–400° F. (191° C.–204° C.) |
| Melting point of cellulose acetate: | about 500° F. (260° C.) |
| Air pressure used for the vacuum clamps: | about 41 psig (2.89 kg/cm$^2$) |
| Air pressure used for venturi tensioning jets: | about 40 psig (2.81 kg/cm$^2$) |
| Time of contact of heating element to material to be spliced: | About 0.25 to 2.0 seconds; usually about 1 second |
| Diameter of heating element 42: | About 0.032 inches (0.81 mm) |
| Width of pressure member 50: | About 3 mm |
| Tension in grams per denier: | about 0.00114 to about 0.00214 |
| Tension in grams per kilotex: | about 10.3 to about 19.2 |
| Tension in each tow band: | about 40–70 grams, preferably about 65 grams |

The following examples are submitted for a better understanding of the invention.

EXAMPLE 1

These experiments involve crimped tows of cellulose acetate fibers of various deniers per filament. When criss-crossed tows are being used, some excellent splices are made which have low visibility but poor consistency. In these experiments, the tow is clamped by mechanical means; the tension is established by attaching weights to the tow bands; the pressure means 50 in the drawings is about 0.5 inches wide (about 1.25 cm) and the timer for the heating element 42 is generally set at a time interval that believed to be sufficient to form a splice. The overall results indicate that it is sometimes possible to produce low-visibility splices but without a major improvement in reproducibility and predictability.

EXAMPLE 2

Crimped cellulose acetate tow of about 3.0 denier/ filament (3.3 decitex) with a total denier of about 35,000 (3.9 kilotex) obtained from regular production is provided for this experiment. The vacuum clamps (26 and 28) and the tensioning means (jets 30 and 32) are placed in position to create a 45-degree orientation between the tow and the wire as shown in FIG. 1. Various experimental conditions (voltage, tow tension, timer settings for operation of heating element 42, etc.) are tested with partial success in attempting to produce low-visibility splices. Some poor splices and "taffy-pull" defects are produced. A "taffy-pull" defect is characterized by polymer which softens or melts sufficiently to become involved in the splicing process and which tends to bridge across with thin thread-like formations from the tow sections to be joined by splice 51 over to the tow sections on the other side which are to be discarded after forming the splice 53. These "taffy-pull" defects can also stick to the heating element 42. However, the vacuum clamps (26 and 28) and jet-tensioning means (30 and 32) are found to be very effective in holding and tensioning the crossed tows. In addition, placement of the tows in the correct positions, clamping and tensioning are accomplished much more quickly, accurately and conveniently than with mechanical clamps and weights. The following operation conditions are used in a series of experiments:

| 1) Timer setting | 1.4 seconds time of activation of the heating element |
| --- | --- |
| 2) Tow tension | 65 to 70 grams in each of the crossed tows |
| 3) Tow angle | 45 degrees with respect to the wire |
| 4) Vacuum clamps | Adjusted as required to hold the tow in position while tensioned at 65 to 70 grams |
| 5) Pressure means | Greatly reduced in width to about 3 mm |

Figure 2:
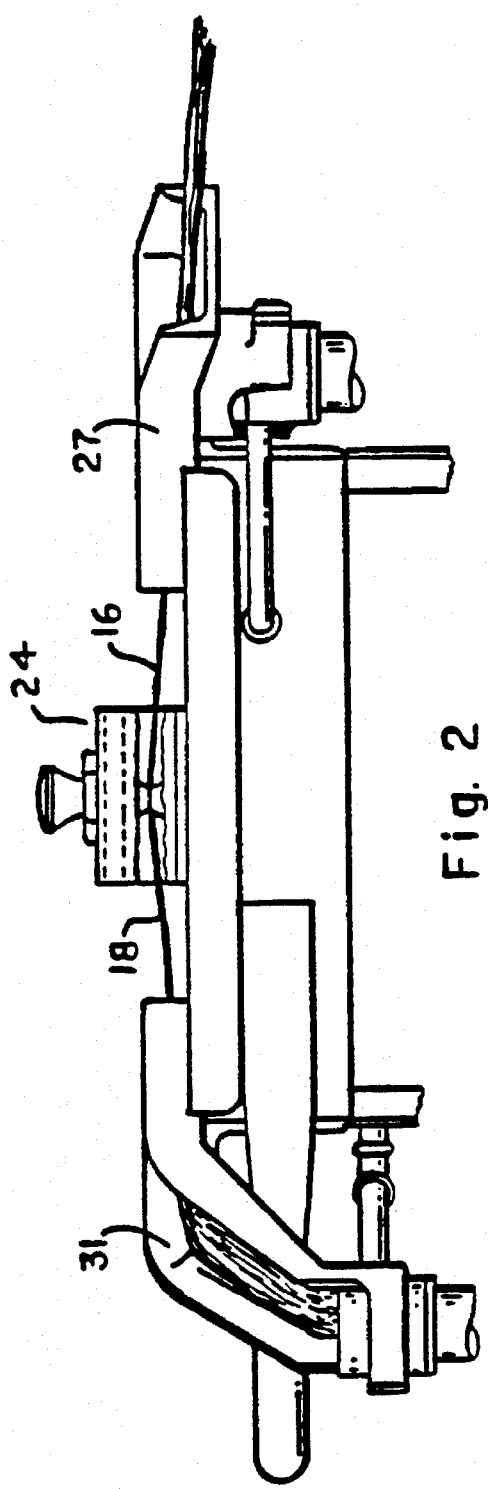
FIG. 2 is an elevation view of the apparatus shown in FIG. 1.
Figure 7:
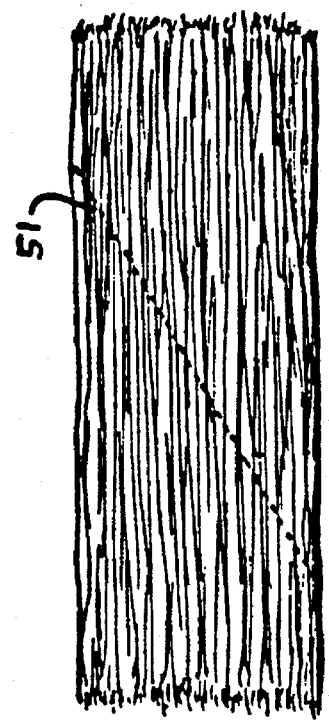
FIG. 7 is a plan view of a section of material spliced by the method and apparatus of this invention.

With these conditions, 55 consecutive satisfactory splices are prepared using standard crimped cellulose acetate tow. During these tests, the timer setting of 1.4 seconds does not leave a satisfactory margin of time between the formation of some splices and timer cut-off. A surprising factor found during this series of diagonal splices is that the spliced tow does not remain clamped between the hot wire and the clamping means (pressure member 50) for the entire 1.4 seconds. Instead, the two criss-crossed tows form an angled splice which retracts spontaneously from the grip of both the heating element 42 and the narrow clamping means identified as pressure means 50. By the term "spontaneous retraction", we are referring to the fact that when such a splice is thus formed, it breaks away from the pressing action of the pressure member 50 and the heating element 42 is a self-releasing manner and comes to rest back in the zone between the two vacuum clamps (clamping means 26 and 28) as shown in FIG. 2. The splices are difficult to detect visually when the tow is inspected. The splices of prior art using a device such as described by Duram (Defensive Publication T913,005) are thicker and much darker than our novel splices. Observers can easily detect the prior-art splices but find it much more difficult to locate our novel low-visibility diagonal splices that we obtained in this Example.

EXAMPLE 3

After the experiments in Example 2 are run making a fairly large number of acceptable splices, there is an irregularly increasing tendency to produce "taffy-pull" defects. The splicer is equipped in the same manner as was described for Example 2 and has the same heating element 42

(nichrome wire, in this case) with which the 55 low-visibility splices are made. The problem continues to become more severe as additional splices are made. An increasingly rough feel on the wire can be detected by running a fingernail along the surface. Cleaning the wire with solvent produces only temporary short-term relief from "taffy-pull" defects.

EXAMPLE 4

A somewhat higher voltage and an increased timer setting are found to be beneficial in obtaining splices formed with spontaneous retraction with a good margin of safety with respect to timer cut-off. At this time, the results of the tests established the following operating conditions:

| 1) Timer setting | 2 seconds |
|---|---|
| 2) Tow tension | 65–70 grams |
| 3) Tow angle | 45 degrees with respect to the wire |
| 4) Vacuum clamp | Adjusted as required to withstand 70 grams of tension |
| 5) Pressure means | Narrow (about 3 mm width) |

A new wire is installed, and it is found that up to about 100 or more satisfactory low-visibility splices can be made using various standard crimped tows of cellulose acetate fiber.

EXAMPLE 5

It is found that by maintaining an extended activation time for the wire beyond that needed to form a splice, an automatic cleaning action is obtained which effectively extends the number of low-visibility splices which can be made and also extends the life of the wire. Thus the operation of the splicer allows the tow to spontaneously retract immediately after the splice has been formed with the wire remaining heated for an additional short time interval to provide a self-cleaning action.

EXAMPLE 6

It is determined that the 45-degree diagonal would be fully satisfactory for loaning splices. However, other angles are evaluated. For example, in one case, Angle "a" (FIG. 1) is set at 60 degrees and no problems are encountered in making low-visibility splices. On the other hand, there is a greater tendency to form "taffy-pull" defects when Angle "a" is set at about 120 degrees. In another test, the two tow bands are placed one above the other and aligned with the wire (heating element 42) to create a splice angle of about 45 degrees. The splices are satisfactory but it is more difficult to align the edges of the bands squarely in this fashion and the arrangement also creates excess fiber on one side of the spliced band.

The optimum for Angle "a" is about 90 degrees, plus or minus about 10 degrees, but it is possible to obtain satisfactory diagonal-splice formation at other angles. Aligning the two bands one above the other at an diagonal to the heating element 42 is less desirable for the reasons stated but could be employed as a means of designing a more narrow unit since the tensioning means and the clamping means are in a straight-line arrangement.

EXAMPLE 7

The following samples are evaluated. Thickness measurements can vary with the variability of the product and the type of instrument used, but the relative values should be reasonably reproducible. In all cases, the tension applied is in the range of about 0.0010 to about 0.0025 grams per denier.

A. Crimped polyester tow of about 1.5 denier per filament (1.7 decitex) with a total tow denier of about 50,000 (5.5 kilotex).

B. Polypropylene ribbon with a thickness of 0.005 inches (0.127 mm) and a width of 0.75 inches (19.1 mm) made by Berwick Industries, Inc. of Berwick, Pa., USA under the tradename "Hi-Sheen".

C. Cellulosic ribbon with a thickness of 0.0045 inches (0.114 mm) and a width of 0.75 inches (19.1 mm) made by Minnesota Mining and Manufacturing Company, Inc. of St. Paul, Minn., under the tradename "Decorette".

D. Crimped cellulose acetate tow of 3.1 denier/ filament (3.4 decitex) with a total tow denier of about 35,000 (3.9 kilotex) from a regular production bale.

Thickness measurements are made by a Starrett Model 436 micrometer with a contact surface of 0.25 inch (6.35 mm) diameter.

The novel splicer is prepared as described in Example 4 and Angle "a" (FIG. 1) is maintained at 90 degrees. The following observations are made:

A. The results with polyester tow are not fully satisfactory from the standpoint of low visibility. The splices have sufficient strength, but are strongly "one-sided". By the term "one-sided", we mean that, on one side, the diagonal splice shows very little, if any, darkened or burned polymer but, on the other side, there was a definite, easily observed, formation of significantly darker, apparently burned or charred, polymer projecting outward from the splice.

B. The polypropylene ribbon also makes strongly "one-sided" splices. One side is reasonably satisfactory from the standpoint of low-visibility. However, the other side had a definite, easily observed, formation of polymer projecting irregularly outward from the diagonal splice.

C. In this test on cellulosic ribbon, consistent formation of diagonal splices of satisfactory strength are not obtained.

D. The diagonal splices obtained with crimped cellulose acetate tow are fully satisfactory from observations made on both sides thereof.

EXAMPLE 8

Crimped cellulose acetate tow, white in color and containing titanium dioxide pigment, of about 35,000 total denier (3.9 kilotex) of about 3.0 denier per filament (3.3 decitex) is obtained for an evaluation of color and lightness/darkness characteristics of prior-art splices compared to our novel splices. The prior-art splices are made according to the method described by Duram in Defensive Publication T913, 005. Our novel splices are prepared as described in Example 4.

These tests are made on a Model CS-5 "Chroma-Sensor" made by Applied Color Systems, Inc. of Princeton, N.J. Each sample is measured and then re-positioned and re-measured using a 3 mm diameter port on the "Chroma-Sensor" spectrophotometer and a 10-degree observer angle to obtain two sixteen-point spectral readings to provide the average value which is used to calculate the CIELAB value (DE*), representing the total color difference between that sample and the "Standard". The sample selected as the "Standard" for any of the comparisons is measured in the same way and the information is stored electronically to make the comparison against the other sample (the "Batch" sample). This procedure is well understood by those who are skilled in the art of using the Model CS-5 "Chroma-Sensor" spectrophotometer and other similar instruments. The novel and the prior-art splices are placed in position so that each splice is centered in the 3 mm port and therefore each has a small amount of adjacent material on each side which is visible to the spectrophotometer. The exposure is done this way for reasons of practicality and convenience. The measurements for the adjacent material simply involve exposure of the material in the 3 mm port without including a splice.

The test procedure described above also provides other values which are useful in distinguishing color and lightness/darkness information. The following comparisons are meaningful in determining whether or not significant differences exist between the novel splices, the prior-art splices and the material adjacent to those varius splices:

DE*—total color difference

DL*—relative darkness or lightness

Da*—red/green response

Db*—yellow/blue response

The DH* values for hue (the dominant color) are significantly different for the novel diagonal splices versus the prior-art splices when compared to the adjacent material which do not have splices. The following table summarizes the CIELAB values obtained when each of the five prior-art splices (Batch A) and each of the four novel splices (Batch B) are compared to the Substantially adjacent material in the tow band which does not contain a splice. Values represent color differences compared to the material selected from the standard.

| Standard: Original Cellulose Acetate Crimped Tow Not Containing a Splice | | | | | |
|---|---|---|---|---|---|
| DE* | DL* | Da* | Db* | DC* | DH* |
| Batch A (Prior Art Splices) | | | | | |
| 10.51 | −7.22 | 0.54 | 7.63 | 7.24 | −2.48 |
| 16.23 | −13.20 | 1.55 | 9.32 | 8.95 | −3.01 |
| 5.42 | −3.24 | 0.77 | 4.28 | 3.88 | −1.95 |
| 9.31 | −5.27 | 1.20 | 7.57 | 7.19 | −2.67 |
| 4.36 | −2.56 | 0.55 | 3.48 | 3.09 | −1.70 |
| Batch B (Novel Diagonal Splices) | | | | | |
| 0.84 | 0.63 | 0.06 | 0.55 | 0.36 | −0.42 |
| 0.71 | 0.51 | 0.12 | −0.48 | −0.28 | 0.41 |
| 1.42 | 1.34 | 0.11 | 0.44 | 0.24 | −0.39 |
| 0.90 | 0.88 | 0.13 | 0.13 | −0.01 | −0.19 |

CIELAB difference of about 1.0 is considered to be the level at which the human eye begins to detect differences. The measurement of color is complex and no absolute generalizations are appropriate. However, the references we have cited provide considerable detail about the instrumentation and calculations related to CIELAB values. Increasingly large CIELAB differences tend to be increasingly easier to see. Color differences are preferably measured as an average using at least two splices in which at least one CIELAB value is determined per splice. The following conclusions are indicated by the data:

1. The total color differences (DE*) between the prior-art splices (Batch A) and the adjacent crimped tow (Standard) are significant and important.

2. Batch A is darker (DL*) than the Standard.

3. Two samples in Batch A have a marginal difference in red/green values (Da*) compared to the Standard. These differences are not considered to be important. The other two samples are not significantly different from the Standard.

4. Batch A is much more yellow than the Standard (Db*).

5. The total color differences (DE*) between the novel splices (Batch B) and the adjacent crimped tow (Standard) are not significant in three of the splices and marginal in one splice. This marginal difference is not considered to be important.

6. Three samples of Batch B are not significantly different in darkness or lightness values (DL*) from the Standard. One sample is marginally lighter than the Standard but this difference is not considered to be important.

7. Batch B is not significantly different in red/green values (Da*) from the Standard.

8. Batch B is not significantly different in yellow/blue values (Db*) from the Standard.

9. DC* (chromaticity) and DH* (hue) reveal significant differences between Batch A and the Standard samples. The differences between Batch B and the Standard are not significant.

10. Overall, the data from this "Chroma-Sensor" evaluation indicated major and important differences between the splices of prior art and the crimped tow which was adjacent to the splices. The differences between the novel splices and the adjacent tow were either not significant or were not large enough to be important. Thus, this data set appears to correlate well with the visual assessment in comparing prior-art splices with our novel diagonal splices.

CIELAB values herein are determined on an Applied Color System "Chroma-Sensor" spectrophotometer, Model CS-5, using a D65 illuminant, 10 degree observer and a 3 mm port, in a manner described in the instrument's user manual ["ASC Chroma Sensor-5 Operation Manual" (4200-0097), copyright 1989, Applied Color Systems, Inc.], well known by those skilled in the art. Also of interest are the reference book "Computer Colorant Formulation by Rolf Kuehni, Lexington Books, D.C. Health & Co., Lexington, Mass. and "Colorimetry and the Calculation of Color Difference" by Ralph Stanziola of Industrial Color Technology, Neshanic Station, N.J.].

The invention has been described in detail with particular reference to preferred embodiments thereof, but it will be understood that variations and modifications can be effected within the spirit and scope of the invention.

We claim:

1. Crimped, generally flat tow comprising cellulose acetate having a diagonal splice of fused fibers extending from edge to edge across its width, said splice being at any angle of between about 20 and about 70 degrees with respect to its length, the total color difference between the tow in said splice on at least one side and unspliced tow is negligible and has an average CIELAB DE* value of less than about 1.4.

2. Crimped tow comprising cellulose acetate containing a diagonal splice of fused fibers extending from edge to edge across its width, said splice being at an angle of between about 20 and 70 degrees with respect to the longitudinal dimension thereof, said splice having been made by crossing two sections of said tow, drawing said sections under a tension sufficient to separate them when severed by fusion, and heating strip of the crossed sections to its fusion temperature until the tow is fused and material on one side of said strip separates from tow on the other side, the total color difference between the tow in said splice and the unspliced tow is negligible and has an average CIELAB DE* value of less than about 1.4.

* * * * *